United States Patent [19]

Yoshida

[11] 4,394,713

[45] Jul. 19, 1983

[54] SELF-SUPPORTING CAPACITOR CASING HAVING A PAIR OF TERMINAL PLATES SANDWICHING AN INSULATIVE BODY FOR ALIGNING TERMINAL POSITIONS

[75] Inventor: Kazunori Yoshida, Tokyo, Japan

[73] Assignee: Nippon Electric Co., Ltd., Tokyo, Japan

[21] Appl. No.: 213,585

[22] Filed: Dec. 5, 1980

[30] Foreign Application Priority Data

Dec. 7, 1979 [JP] Japan .......................... 54-169518[U]

[51] Int. Cl.³ .......................... B01J 17/00; H01G 9/00
[52] U.S. Cl. .................................... 361/433; 361/271; 29/570
[58] Field of Search .................... 361/433, 271; 29/570

[56] References Cited

U.S. PATENT DOCUMENTS

| | | | |
|---|---|---|---|
| 2,617,863 | 11/1952 | Stinson | 361/433 |
| 2,816,153 | 12/1957 | Kort | 361/433 |
| 3,440,494 | 4/1969 | Wade | 361/433 |
| 3,475,659 | 10/1969 | Buice et al. | 361/433 |
| 4,313,084 | 1/1982 | Hosokawa | 361/433 |

*Primary Examiner*—Andrew J. James
*Attorney, Agent, or Firm*—Laff, Whitesel, Conte & Saret

[57] ABSTRACT

A package construction has electrodes of a double layer capacitor element located on the opposite sides of the element. All of the electrodes are led out in the same direction. A pair of electrode plates are disposed on the element with an insulator plate having a through-hole interposed between the two plates. A terminal of an inner electrode plate penetrates through the through-hole in the insulator plate and through an aperture formed in the outer electrode plate. The capacitor is assembled in such manner that the inner electrode plate is electrically connected to one electrode of the element, while the outer electrode plate is electrically connected to the other electrode of the element via a conductive casing.

10 Claims, 9 Drawing Figures

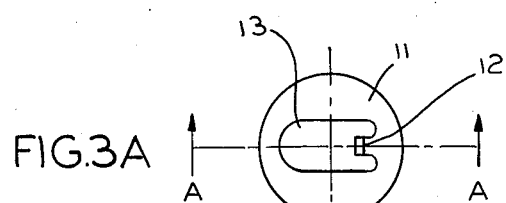
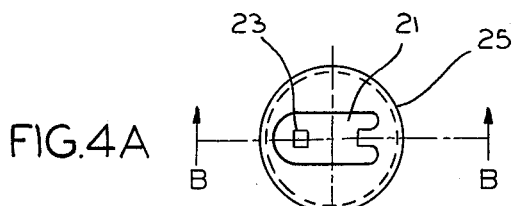
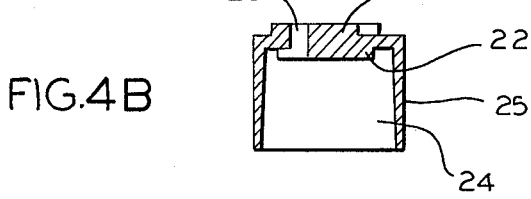
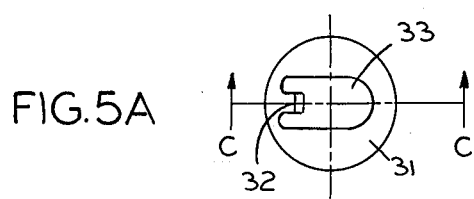
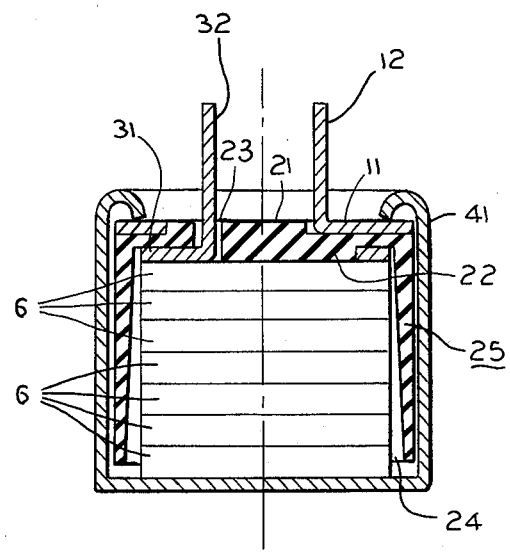

SELF-SUPPORTING CAPACITOR CASING HAVING A PAIR OF TERMINAL PLATES SANDWICHING AN INSULATIVE BODY FOR ALIGNING TERMINAL POSITIONS

The present invention relates to an electric double-layer capacitor, and more particularly to a casing structure of a self-supporting type of electric double-layer capacitor.

One approach for obtaining a capacitor having a large capacity, utilizing the production of an electric double-layer by contacting activated carbon particles with an electrolyte, is disclosed in the specification of U.S. Pat. No. 3,536,963.

U.S. Pat. No. 4,189,529, for instance, discloses a casing of a self-supporting type, packing a laminated assembly of a plurality of battery cells in each of which positive and negative polarities appear on the opposite faces, but any practical means for applying a pressure to each cell and for maintaining the pressure is not disclosed. Moreover, with regard to a mounting structure for the electrode terminals also, merely electric wirings are schematically shown. There is no practical means for realizing these electric wirings as disclosed.

On the other hand, U.S. Pat. No. 4,013,818 teaches a technique of packing laminated battery cells, in which a positive electrode terminal is led out along a center axis and an outer sheath case is used as a positive electrode terminal. For a non self-supporting type, as is the case with this prior art example, it is believed that the assembly process can be simplified owing to the facts that one of the electrode terminals is disposed along a center axis of the case and that the outer sheath case is substituted for the negative electrode terminal. However, in the event of assembling capacitor parts in a circuit, if miniaturization of the parts themselves and easiness in connection with the circuit are taken into consideration, then the self-supporting structure would be most favorable.

However, when designing a self-supporting type of structure, there is a problem of positioning the respective terminals in the assembling process, because a pair of electrode terminals must be provided at positions which are deviated from a center axis of a package. This positioning is one of the important problems in the mass-production process, and it becomes one of the factors which determine the cost of the products. Especially, improving the structure that is constructed to apply a pressure to a capacitor element and is yet of self-supporting type, so as to be adapted for mass-production, is an essentially necessary matter for supplying to the market, at low cost, large capacity and high withstand voltage electic double-layer capacitors.

It is, therefore, one object of the present invention to provide an electrode terminal structure in which the positioning of electrode terminals having a self-supporting type structure can be easily achieved in a mass-production process.

Another object of the present invention is to provide a casing that is simple and easy to assemble. The casing is a self-supporting type for a capacitor element which has a configuration wherein two electrode surfaces appear on the opposite faces of the capacitor element and with a desirably applied pressure.

Still another object of the present invention is to provide a self-supporting type, electric, double layer capacitor having a high withstand voltage structure wherein the capacitor is easy to assemble and is adapted for mass-production. Another object is to provide a high withstand voltage capacitor element having a plurality of laminated electric double-layer capacitor cells, realized in a self-supporting type structure.

The basic technical concept of the present invention resides in achieving a package construction in which electrodes of a double layer capacitor element are located on the opposite sides of the element and are led out in the same direction. A principal feature of the present invention is to realize this technical concept in a construction in which a pair of electrode plates are disposed on the element with an insulator plate having a through-hole interposed between the two plates. A terminal of the electrode plate is located inside and penetrates through the through-hole in the insulator plate. An aperture is in turn formed in the electrode plate located outside. The capacitor is assembled in such manner that the inner electrode plate is electrically connected to one electrode of the element, while the outer electrode plate is electrically connected to the other electrode of the element, the last connection being via a conductive casing.

One preferred embodiment of the self-supporting type of electric double-layer capacitor, according to the present invention, is constructed in the following manner. At first, a capacitor element is prepared comprising a unit cell of the electric double-layer capacitor cell or a cell-laminated body of a plurality of such cells, and also prepared are inner and outer electrode plates which are to be connected respectively to the opposite electrodes of this capacitor element. Each one of these electrodes includes an aperture to be used for positioning and a terminal that is approximately perpendicular to the surface of the electrode plate. The inner electrode plate makes direct contact with one electrode of the capacitor element.

These capacitor elements and the inner electrode plate are accommodated in an insulator case having a bottom. On the inner surface of the bottom of the insulator case, a protrusion is formed for positioning the inner electrode plate, and a through-hole is also formed for enabling the terminal of the inner electrode plate to penetrate therethrough. The inner electrode plate is mounted on the inner surface of the thus formed bottom portion.

The insulator case containing the capacitor element and the inner electrode plate, is accommodated within a conductor case having a bottom so that the open end of the insulator case may face the bottom of the conductor case. The other electrode of the capacitor elemet is brought into direct electrical contact with the bottom of the conductor case. On the outer surface of the bottom of the insulator case, another protrusion is formed for positioning the outer electrode plate. The terminal of the inner electrode plate penetrates through the aperture in the outer electrode plate. The open end of the conductor case is caulked along the circumference of the outer electrode plate to complete the electrical conduction between the outer electrode plate and the other electrode of the capacitor element. At the same time, owing to the caulking, a predetermined pressure is applied to the capacitor element.

The above-mentioned and other features and objects of the present invention will become more apparent by reference to the following description of one preferred embodiment of the invention taken in conjunction with the accompanying drawings, wherein:

FIG. 3A is a plan view showing one preferred embodiment of an outer electrode plate to be used according to the present invention;

FIG. 3B is a cross-sectional view taken along line A—A in FIG. 3A;

FIG. 4A is a plan view showing one preferred embodiment of an insulator case to be used according to the present invention;

FIG. 4B is a cross-sectional view taken along line B—B in FIG. 4A;

FIG. 5A is a plan view showing one preferred embodiment of an inner electrode plate to be used according to the present invention;

FIG. 5B is a cross-sectional view taken along line C—C in FIG. 5A; and

FIG. 6 is a longitudinal cross-section view showing one preferred embodiment of a self-supporting type electric double-layer capacitor according to the present invention.

Figure 1:
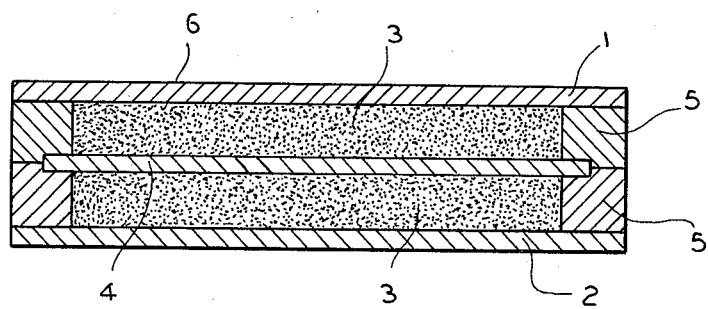
FIG. 1 shows a cross-sectional view of a unit cell of a conventional electric double-layer capacitor used according to the present invention.

One example of a heretofore known electric double-layer capacitor unit cell is illustrated in cross-section in FIG. 1. In this figure, a pair of carbon paste electrodes 3 are disposed between a top cover 1 and a bottom plate 2, both electrodes being made of conductive resilient material, such as a conductive rubber. The carbon paste electrodes 3 include activated carbon particles and an electrolyte solution, such as an aqueous solution of sulfuric acid. The pair of carbon paste electrodes 3 are disposed in an opposed relationship by the intermediary of a porous separator 4 which is ion-permeable and non-conductive. In addition, side walls are made of an electrical insulator and resilient material, such as rubber, in order to clamp the separator 4 therebetween. In a capacitor cell having the above-described construction, the top cover 1 and the bottom plate 2 serve as electrodes for the capacitor cell.

However, a capacitor withstand voltage for a capacitor cell having such a structure is determined by an electrolytic voltage of the electrolyte solution. If it is desirable to obtain a high withstand voltage capacitor, it is necessary to form a cell-laminated type structure in which a plurality of capacitor cells, each as shown in FIG. 1, are piled one on the other and electrically connected in series.

Figure 2:
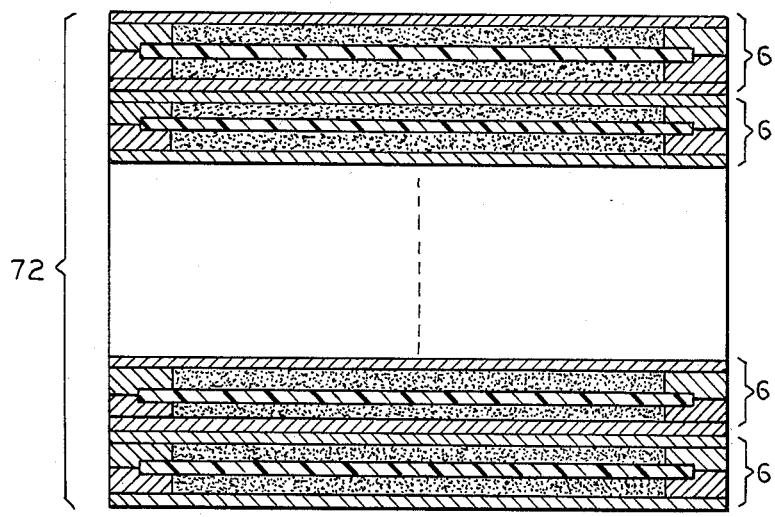
FIG. 2 shows a cross-sectional view of a cell-laminated body formed by piling up n unit cells each of which is shown in FIG. 1.

One example of a laminated type electric double-layer capacitor is illustrated in cross-section in FIG. 2, which shows a lamination of n capacitor cells, each cell being constructed as shown in FIG. 1. The number n of the laminated cells is selected to provide a desired withstand voltage.

In such a laminated structure, the contact resistance becomes large between the adjacent cells. The contact resistance also becomes large between the activated carbon particles in each cell. Hence, as a whole, the internal resistance of the completed capacitor becomes very large. In order to prevent this increase of the internal resistance, it is necessary to provide a desirable casing of the laminated capacitors such that an appropriate contact pressure may be applied to and maintained between the top and bottom surfaces the cell-laminated body. Moreover, in the above-described laminated structure, the electrodes of the capacitor element comprising the cell-laminated body appear at the uppermost and lowermost surfaces. It is very difficult to form the case in a self-supporting configuration, that is, in such configuration that two electrodes are provided on one end surface of the case.

While a self-supporting configuration is commonly found in the electrolytic capacitor art, the case structure employed in the heretofore known self-supporting type electrolytic capacitor cannot be used in itself, because in the electric double-layer capacitor art there is a problem of applying and maintaining a suitable contact pressure in addition to the problem of accommodating the two electrode surfaces which appear on the opposite faces of the capacitor element.

In FIGS. 3A and 3B and FIGS. 5A and 5B, electrode plates 11 and 31 have the portion surrounding a tab which is later formed into an electrode terminal which is stamped out leaving a tab. These tabs are perpendicular to the electrode plates and form elongated electrode terminals 12 and 32. An aperture 13 is formed in the outer electrode plate 11 in such a size that the inner electrode terminal 32 may pass through the aperture 13 without contacting the outer electrode plate 11. The material of these electrodes could be any metal having good conductivity, workability and corrosion-resistance, such as nickel-plate copper.

An inner sheath case or insulator case 25 shown in FIGS. 4A and 4B electrically insulates the outer electrode plate 11 from the inner electrode plate 31 and also positions them relative to each other. More particularly, on the top of the case 25 is a top surface side protrusion 21 for positioning the outer electrode plate 11. On the inside surface of the case 25 opposite to the protrusion 21 is an inner surface side protrusion 22 for positioning the inner electrode plate 31. By making the contours of these protrusions 21 and 22, respectively, nearly conform to the shapes of the apertures 13 and 33 in the electrode plates 11 and 31 as shown in FIGS. 3 to 5, the relative positioning between the electrode plates 11 and 31 can be uniquely determined.

A through-hole 23 commonly penetrates through the both protrusions 21 and 22. Hole 23 is provided for leading out the inner elongated electrode terminal 32, and has a cross-sectional shape which is analogous to the shape of the internal electrode terminal 32. The case 25 further comprises a cylindrical cavity 24 which can accommodate the cell-laminated body. The cavity 24 is opened at one end so that it can naturally position the cell-laminated body. The material of the case 25 should be preferably a mouldable and less brittle insulator, such as polyacetal.

As shown in FIG. 6, according to one preferred embodiment of the present invention, the side wall of the inner sheath case 25 is tapered to become thinner as it is nearer to the open end. The inner diameter of the case 25 at the open end is designed to be larger than the inner diameter at a deeper portion of the sheath case 25. Thereby an insertion of the cell-laminated body into the sheath case 25 is facilitated. It is to be noted that in FIG. 6, an illustration of the cross-section of the internal structures of the respective cells 6 is omitted. In the following disclosure, the illustrated preferred embodiment will be explained in the sequence of assembling steps. At first, the inner electrode plate 31 is inserted into the inner sheath case 25 with its electrode terminal 32 passed through the through-hole 23 of the inner sheath case 25 and its aperture 33 (FIG. 5A) fitted around the inner surface side of protrusion 22 of the inner sheath case 25, and thereby their relative positioning can be accomplished. Then, while the lower opening of the inner sheath case 25 is directed upwardly, a desired number of cells 6 are inserted into the inner sheath case 25. The outer sheath case 41 is fitted around the inner sheath case 25 with the opening of the outer sheath case 41 directed downwardly so that the outer circumference of the inner sheath case 25 may be completely covered by the outer sheath case 41.

Subsequently, the outer electrode plate 11 is inserted into the outer sheath case 41 so that the plate 11 may be positioned relative to the case 41 with the aperture 13 (FIG. 3A) of the outer electrode plate 11 fitted around the outer surface side protrusion 22 of the inner sheath case 25. Then the top end portion of the outer sheath case 41 is bent inwardly to be caulked while applying a pressure to the cell-laminated body by the intermediary of the outer electrode plate 11, the inner sheath case 25 and the inner electrode plate 31 as shown in FIG. 6. The pressure for caulking is about 15~20 Kg/cm² and is applied to the cell-laminated body. The outer sheath case 41 could be made of any sheet material which can be caulked at the desired pressure such as, for example, a zinc plated steel sheet of about 0.3 mm in thickness.

With the above-described structure, the electrode of the lower-most capacitor 6 located at the bottom of the laminate can be electrically connected to the outer electrode plate 11 via the outer sheath case 41. Furthermore, the electrode of the uppermost capacitor located at the top of the laminate can be externally connected via the inner electrode plate 31. In addition, by means of the inner sheath case 25, the outer electrode plate 11 and the outer sheath case 41 can reliably be electrically insulated from the inner electrode plate 31, and the outer circumference of the cell-laminated body can reliably be electrically insulated from the outer sheath case 41.

Owing to the above-described structure, a relative positioning of the electrode terminals can be achieved automatically. The self-supporting type of electric double-layer capacitor, according to the present invention, has an extremely favorable structure for an automatic assembling process. Moreover, the positioning of the cell-laminated body can be also automated by employing the tapered inner circumferential surface of the side wall of the inner sheath case. In addition, the small number of component parts of the self-supporting type case according to the present invention is also one factor for the adaptability for mass-production. The small number of component parts is not only in itself economical but also results in a self-supporting type electric double-layer capacitor having little chance of failure. Furthermore, a predetermined pressure can be applied and maintained by one step of caulking without requiring an additional welding process. Therefore, there is a high reliability over a long period of time which can be realized through a very easy working process.

As described above, the self-supporting type of electric double-layer capacitor according to the present invention can be realized at low cost, and hence it is industrially very valuable. It is to be noted that although the height of the inner surface side protrusion 22 of the inner sheath case 25 and the thickness of the inner electrode plate 11 are illustrated as being the same in FIG. 6, in order to assume the electrical connection between the inner electrode plate 11 and the uppermost electrode of the cell-laminated body 6, it is preferable to select the thickness of the inner electrode plate 11 so that it is somewhat lower than the height of the inner surface side protrusion 22. With regard to the depth of the inner sheath case 25, the depth is preferably designed to be less than the height of the cell-laminated body 6, by taking into consideration the reliability of the electrical contact between the lowermot electrode of the cell-laminated body 6 and the outer sheath case 41.

Taking into account the aforementioned matters, one example of a design of the self-supporting type of electric double-layer capacitor, according to the present invention, will be described in connection to practical numerical data. At first, let us consider the case where 8 unit cells each having a diameter of 12 mm and a height of 1.4 mm are piled up. The thus formed cell-laminated body of 11.2 mm in height is assembled in a capacitor element. In this case, the inner sheath case 25 has dimensions which are selected to be 10 mm in depth, 13.5 mm in inner diameter at the open end, 13 mm in inner diameter at the bottom end, 14.5 mm in outer diameter, and 12 mm in height.

For the outer electrode plate 11 and the inner electrode plate 31, a nickel-plated copper sheet of 0.6 mm in thickness is used, which is stamped and bent into the shapes shown in FIGS. 3A and 3B and in FIGS. 5A and 5B, respectively. The diameter of the inner electrode plate 31 is 12.5 mm, and the terminal 32 is dimentioned to be 1.2 mm in width and 6 mm in height. On the other hand, the diameter of the outer electrode plate 11 is 15 mm, and its terminal 12 is dimensioned to be 1.2 mm in width and 4.4 mm in height so that the top ends of the respective terminals 12 and 22 may come to the same level after assembly. Since the thickness of the inner electrode plate 31 was selected to be 0.6 mm, the height of the inner surface side protrusion 22 of the inner sheath case 25 is chosen to be about 0.4 mm. Although the height of the outer surface side protrusion 21 is not strictly defined, in view of good appearance it is chosen to be about 0.6 mm. The cross-section of the through-hole 23 is designed to be a rectangle of 1 mm×2 mm, for facilitating insertion of the electrode terminal 32.

The outer sheath case 41 is formed of a zinc-plated steel sheet of 0.3 mm in thickness, and it has a shape of a can of 15.5 mm in inner diameter and 15 mm in height before caulking. The outer sheath case 41 is sealingly caulked onto the upper surface of the outer electrode plate 11 by means of caulking dies so that a pressure of 15~20 Kg/cm² may be applied to the cell-laminated body 6. The caulking brings the open end of the outer sheath case 41 into tight contact with the entire outer periphery of the outer electrode plate 11 to assure an electrical contact pressure therebetween.

In order that the caulking pressure may be stably applied to the cell-laminated body over a long period of time, preferably the bottom wall of the inner sheath case 25 should have resiliency. In view of this requirement, preferably the material of the inner sheath case 25 should be an insulator material such as polyacetal, that is easy to shape so that a desired bottom configuration may be easily obtained and is also resilient. After being sealingly caulked, a sealed structure having a higher reliability can be realized by potting the interior of the outer sheath case with a room temperature setting type double fluid epoxide potting resin. The resulting self-supporting type electric double-layer capacitor becomes a very valuable product with a high withstand voltage, large capacitance capacitor having a withstand voltage of 5 volts and a capacitance of 0.05 farads.

While the present invention has been described in detail above, in connection to one preferred embodiment thereof illustrated in FIG. 6, various modifications could be made to the illustrated structure. For instance, although the simplest structure was illustrated in which the uppermost and lowermost electrodes of the cell-laminated body are brought into direct contact with the inner electrode plate and the outer sheath case, respectively, it is not impossible to bring them into indirect contact rather than direct contact with each other through the number of component parts is increased.

Also, a further simplified structure can be conceived. That is, one can conceive of the modification in which the side wall of the inner sheath case is omitted, or in which an insulator plate merely having a through-hole only with both the side wall and the protrusions on the bottom wall omitted, is utilized in place of the inner sheath case. However, in such modifications, it will be necessary to make provisions so that any insulating means is disposed between the side surface of the cell-laminated body and the outer sheath case.

In addition, the construction of the electrode plates are not limited to the illustrated ones. Especially with regard to the aperture of the outer electrode plate, as a matter of course, any configuration could be employed therefor, provided that the electrode terminal of the inner electrode plate can penetrate therethrough without contacting the outer electrode plate. Furthermore, it is possible that, at the time when the inner sheath case 25 is moulded, either one or both of the outer electrode plate 11 and the inner electrode plate 31 may be integrally jointed with the inner sheath case 25. Then the assembling work becomes easier.

What is claimed is:

1. A self-supporting double-layer electrical capacitor comprising a conductive case having a bottom portion, an open end portion, and a side wall portion extending therebetween; a laminated capacitor body having a plurality of double-layer electrical capacitor cells disposed within said conductive case and having opposed first and second electrodes substantially parallel to each other, said first electrode facing the inner bottom portion of said conductive case and being electrically connected thereto; a first terminal plate disposed on said second electrode and being electrically connected thereto, said first terminal plate having a first elongated terminal portion which is substantially perpendicular to a principal surface of said first terminal plate and supported away from said side wall of said conductive case, said first elongated terminal portion extending toward said open end portion and set away from a center axis of said conductive case; insulating means for electrically isolating said first terminal plate and said laminated capacitor body from the side wall portion of said conductive case; an insulative body disposed on said first terminal plate and having an opening for said first elongated terminal portion to pass through; and a second terminal plate disposed on said insulative body and having an opening for said first elongated terminal portion to pass through, said second terminal plate having a second elongated terminal portion substantially perpendicular to a principal surface thereof and supported away from said side wall of said conductive case, said second elongated terminal portion extending toward said open end portion and set away from the center axis of said conductive case, said second terminal plate and said insulative body having complimentary contours for positioning said second terminal plate so that said first elongated terminal portion passing through the opening of said insulative body is electrically isolated from said second terminal plate, said open end portion of said conductive case being caulked onto a periphery of said second terminal plate for making an electrical connection thereto, said caulking pressing said second terminal plate toward the bottom of said conductive case, whereby electrical connections are achieved entirely by a mechanical pressure.

2. The self-supporting double-layer electrical capacitor as claimed in claim 1, in which said first terminal plate and said insulative body have complimentary contours for fixing a relative position therebetween.

3. The self-supporting double-layer electrical capacitor as claimed in claim 1, in which said insulative body and said insulative means are physically integrated with each other to form a cup-shaped insulative case.

4. The self-supporting double-layer electrical capacitor as claimed in claim 1, in which said insulative body has resiliency.

5. The self-supporting double-layer electrical capacitor as claimed in claim 1, in which said first and second elongated terminal portions are formed by bending up portions of said first and second terminal plates, respectively.

6. The self-supporting double-layer electrical capacitor as claimed in claim 5, said first and second terminal plates have substantially the same configuration.

7. The self-supporting double-layer electrical capacitor as claimed in claim 3, in which the inner diameter of said insulative case gradually increases toward its open end.

8. A casing structure for a laminated capacitor having a plurality of double-layer electrical capacitor cells, said casing comprising a resilient insulative case having an open end portion and a substantially closed bottom portion with a hole penetrating said bottom portion, said hole having a center axis spaced away from a center axis of said insulative case, said bottom portion having a first and second protrusions on its inner and outer sides, respectively; an inside electrode plate attached to the inner side of said bottom portion, said inside electrode plate having a first opening fitting around said first protrusion on the inner side of said bottom portion for fixing a relative position therebetween said inside electrode plate also having a first elongated electrode terminal passing through said hole;

an outside electrode plate attached to the outer side of said bottom portion, said outside electrode plate having a second opening for passing said first elongated electrode terminal therethrough while precluding electrical contact between said outside electrode plate and said first terminal, said second opening being fitted around said second protrusion on the outer side of said bottom portion, said second electrode plate also having a second elongated electrode terminal extending along side said first elongated electrode terminal, said second elongated electrode terminal being spaced away from the center axis of said insulative case and being substantially parallel to said first elongated electrode terminal; a laminated capacitor element disposed within said insulative case, said laminated capacitor element having a plurality of double-layer electrical capacitor cells stacked one on the other and being electrically connected in series, each of said cells having a pair of opposed electrodes substantially parallel to each other, said inside electrode plate being in face-to-face contact with an outermost electrode of said laminated capacitor element; a conductive case enclosing said insulative case, said inside and outside electrode plates and said laminated capacitor element, said conductive case having a bottom portion and an open end portion, said bottom portion of said conductive case being in a face-to-face contact with the other outermost electrode of said laminated capacitor element, said open end portion of said conductive case being caulked onto the periphery of said outside electrode plate without touching said first elongated electrode terminal for precluding any electrical connection therebetween and for pressing said outside electrode plate toward said bottom portions of said insulative case and said conductive case.

9. A capacitor assembly comprising a resilient insulative case having an open end portion and a substantially closed bottom portion with a hole penetrating said bottom portion, said hole having a center axis which is separated from a center axis of said insulative case, said bottom portion having first and second protrusions on its inner and outer sides, respectively; an inside terminal plate attached to the inner side of said bottom portion, said inside terminal plate having a first opening fitting around said first protrusion on the inner side of said bottom portion for fixing a relative position therebetween, said inside terminal plate also having a first elongated terminal portion passing through said hole; an outside terminal plate attached to the outer side of said bottom portion, said outside terminal plate having a second opening for said first elongated terminal portion to pass through while precluding electrical contact between said outside plate and said first terminal, said second opening being fitted around said second protrusion on the outer side of said bottom portion, said second terminal plate also having a second elongated terminal portion extending along side said first elongated terminal portion, said second elongated terminal portion being separated from the center axis of said insulative case and substantially parallel to said first elongated terminal portion; a laminated capacitor element disposed within said insulative case, said laminated capacitor element having a plurality of capacitor cells stacked one on the other and being electrically connected in series, each of said cells having a pair of opposed electrodes which are substantially parallel to each other, said inside terminal plate being in face-to-face contact with an outermost electrode of said laminated capacitor element; and a conductive case enclosing said insulative case, said inside and outside terminal plates and said laminated capacitor elements, said conductive case having a bottom portion and an open end portion, said conductive case being in a face-to-face contact with another outermost electrode of said laminated capacitor element, said open end portion of said conductive case being caulked onto the periphery of said outside terminal plate without making an electrical connection between said first elongated terminal portion and said case, said caulking pressing said outside terminal plate toward said bottom portions of said insulative case and conductive case.

10. A capacitor assembly comprising a conductive case having a bottom portion and an open end portion with a side wall portion extending therebetween; a laminated capacitor body disposed within said conductive case and having opposed first and second electrodes substantially parallel to each other, said first electrode of said laminated capacitor body facing the inner bottom of said conductive case and being electrically connected thereto; a first terminal plate disposed on said second electrode of said laminated capacitor body and being electrically connected thereto, said first terminal plate having a first elongated terminal portion substantially normal to a principal surface of said first terminal plate and positioned away from said side wall of said conductive case, said first elongated terminal portion extending toward said open end portion and being separated from a center axis of said conductive case; a second terminal plate disposed at and electrically connected to the open end portion of said conductive case, said second terminal plate having an opening through which said first elongated terminal portion extends, said second terminal plate having a second elongated terminal portion substantially normal to a principal surface of said second terminal plate and being separated from said side wall of said conductive case, said second elongated terminal portion extending from said open end portion and being separated from the center axis of said conductive case; and an insulative body sandwiched between said first and second terminal plates and having an opening for said first elongated terminal portion to pass through, said first and second terminal plates and said insulative body having complimentary contours for automatically fixing the relative position of said first and second terminal plates.

* * * * *